March 19, 1946.   R. P. MOORE   2,396,962
MEANS FOR MAINTAINING CONSTANT DIFFERENTIAL ACROSS VALVES
Filed Oct. 28, 1944   3 Sheets-Sheet 1

INVENTOR:
RICHARD PIERPONT MOORE
BY: Robert H. Jacob
AGENT

March 19, 1946.   R. P. MOORE   2,396,962
MEANS FOR MAINTAINING CONSTANT DIFFERENTIAL ACROSS VALVES
Filed Oct. 28, 1944   3 Sheets-Sheet 2

INVENTOR:
RICHARD PIERPONT MOORE
BY: Robert N. Jacobs
AGENT

March 19, 1946.　　　R. P. MOORE　　　2,396,962
MEANS FOR MAINTAINING CONSTANT DIFFERENTIAL ACROSS VALVES
Filed Oct. 28, 1944　　　3 Sheets-Sheet 3

INVENTOR:
RICHARD PIERPONT MO
BY: Robert N. Jacob
AGENT

Patented Mar. 19, 1946

2,396,962

UNITED STATES PATENT OFFICE 2,396,962

MEANS FOR MAINTAINING CONSTANT DIFFERENTIAL PRESSURE ACROSS VALVES

Richard Pierpont Moore, Roodekop, near Germiston, Transvaal, Union of South Africa, assignor to The Moore Filter Company Limited, Johannesburg, Transvaal, Union of South Africa Application October 28, 1944, Serial No. 560,892
In the Union of South Africa December 7, 1943

13 Claims. (Cl. 137—165)

This invention relates to means for maintaining a constant difference in pressure across valves or orifices when such valves or orifices are fed by gravity from a tank containing chemical solution or other liquid.

As is well known, the accurate regulation of a flow of liquid by an orifice or valve is achieved when there is a constant difference between the pressure on the one side or upstream side of the valve or orifice and the pressure on the other side or downstream side of the valve or orifice.

Hitherto, means for keeping this difference in pressure across a valve or orifice constant consisted either of feeding the liquid to the valve or orifice from a constant-level tank in which the liquid level is controlled by a float which is fed with the liquid from a main feed tank, or by incorporating the valve or orifice in a float or attaching it to the float so that, as the level of the liquid drops in the tank in which the float is placed, the valve or orifice drops a proportionate amount and the head above such valve or orifice is maintained constant.

Both these methods involve the use of means for controlling the pressure on the upstream side of the valve or orifice, or for preventing this pressure from varying as the level of the liquid in the main feed tank drops. Each method has disadvantages. In the first method, the disadvantages are that chemical float valves are liable to stick or become choked and clogged up and, unless compensated, they react variably as the pressure of the liquid from the main feed tank varies. This method also involves the use and expense of a constant level tank and the expense and inconvenience of regular cleaning and servicing of a float valve. The disadvantages of the second method are, firstly, that it is impractical to adapt this method to the automatic proportional dosing of chemical solutions and, secondly, that, since the valve is floating on the liquid, it is not so readily accessible or accurately manipulated as it would be if it were fixed.

The object of the present invention is to overcome or reduce these disadvantages by varying the head on the downstream side of the orifice or valve, this variation in head being in exact accordance with the variation in head on the upstream side of the valve or orifice which naturally takes place as the level of the liquid in the tank drops in use.

According to the invention, I provide means, for maintaining constant differential pressure on valves or orifices, in which a miniature weir or knife edge is incorporated in a float which is placed in a tank containing the liquid to be fed to the valve or orifice, and in which the valve or orifice is located outside the tank at a point below the lowest level assumed by the liquid therein, so that the discharge from this valve or orifice is carried over the weir or knife edge and thence to the point of dosage, and so that the float rests on the liquid in such a manner that the weir or knife edge is maintained at a constant distance below the surface of the liquid irrespective of the level thereof. The valve or orifice (hereinafter referred to as the "valve") is placed in communication on the upstream or inlet side of its seat with the liquid in the tank and on the downstream or outlet side, by means of a closed flexible conduit, with the miniature weir or knife edge, the discharge from the weir being carried by a second closed flexible conduit to a point outside the tank below the level of the liquid. The miniature weir or knife edge is isolated (by the body which contains it) from direct communication with the liquid in which it floats but is preferably placed in communication with the atmosphere by means of an air vent located immediately above it.

The float may also be used to carry a floating intake and strainer, in which case the upstream or inlet side of the valve is placed in communication with the liquid in the tank through such floating intake and strainer (by means of a closed flexible conduit). The intake would preferably be of the underslung type, i. e. underslung below the float.

The valve just mentioned may be of any convenient type. If the valve is to be used purely for regulating the volume of flow, the valve body may contain mercury or other fluid (between which and a knife edge or other solid member a valve opening is constituted) and be fixed to the bottom of the main feed tank or otherwise outside the same below the lowermost level reached by the liquid in the tank, and regulation is effected by varying this opening, as for example, by means of a screw plunger adapted to raise or lower the mercury or like surface. On the other hand, if the valve is to be used for automatic proportional dosage, means is provided for varying the extent of the valve opening automatically in accordance with the level of the liquid to be dosed in the dosage tank. In addition to such means, the screw plunger or other means for initially adjusting the valve opening may be employed. In one embodiment, the valve body is mounted on or forms part of a lever, of which one end is pivotally supported on a bracket secured to the bottom of the main feed tank, and of which the other end is connected by a link to a float resting on the surface of the liquid in a weir chamber of known construction through which the liquid to be dosed flows. In this case, the knife edge or other solid member depending above the level of the mercury or like fluid is off-set from the middle or centre of the mercury or like surface in the direction of the lever, so that, as the float on the surface of the liquid in the dosage tank rises or falls, the valve body tips and the surface of the mercury or like fluid recedes from or approaches towards the knife edge or solid member thereby increasing or decreasing the valve opening.

Preferably, the floating knife edge or miniature weir provided in the float in the main feed tank is adjustable in height so that the constant-head of the liquid drawn off may be initially set to any desired value. Between the entrant and exit sides of the floating knife edge or weir, an air vent is preferably provided so as to obviate the development of a siphon within the device and the tube or conduit for delivering the liquid to its point of application.

A dosing equipment embodying the invention will now be described, by way of example, with reference to the accompanying drawings, in which.

Figure 1:
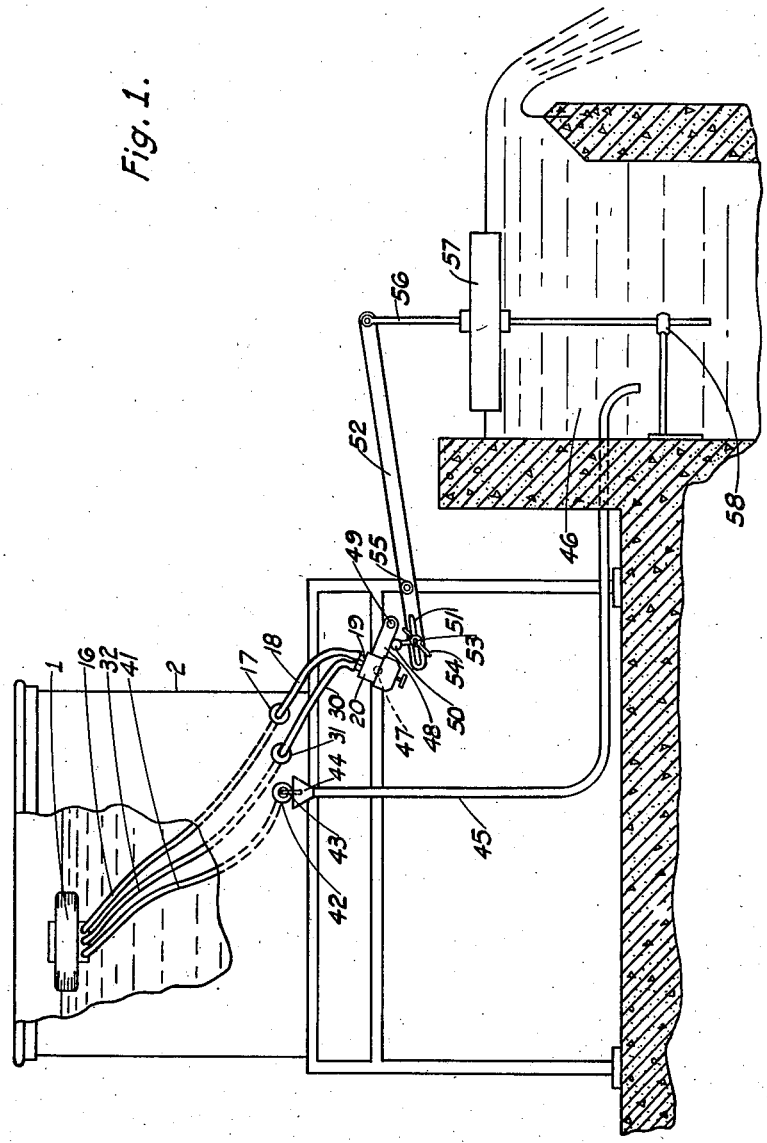
Fig. 1 is a front elevation of the equipment, with part of the tank broken away to illustrate the float.
Figure 2:
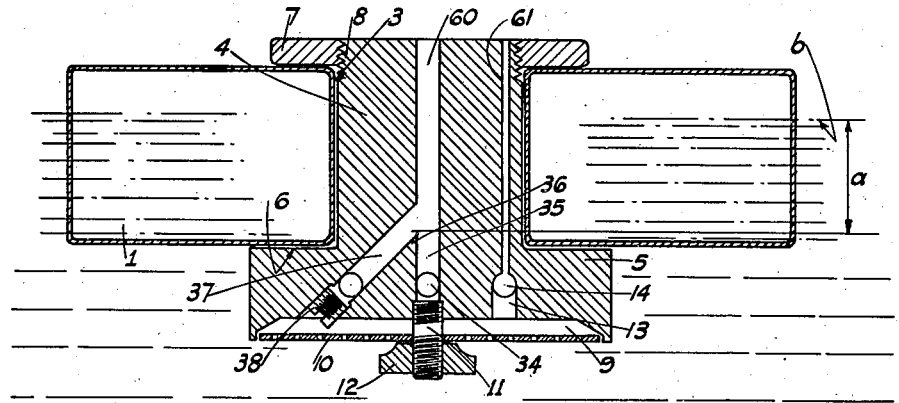
Fig. 2 is a relatively enlarged view of the float and the parts carried thereby, in vertical half section.

Referring to the drawings:

A float 1 is placed in the chemical solution contained in a main feed tank 2. The float 1 is of a hollow flattened shape for the sake of stability and is provided, as shown in Fig. 2, with a central recess 3. The extension 4 of a cylindrical body 5 is inserted up into the central recess 3. The shoulder 6 of the body 5 bears against the under-surface of the float 1 and a nut 7 tightened upon the screw-threaded portion 8 of the extension 4 serves to hold the float 1 and body 5 securely together, with the body 5 underslung below the float in a central position.

Figure 3:
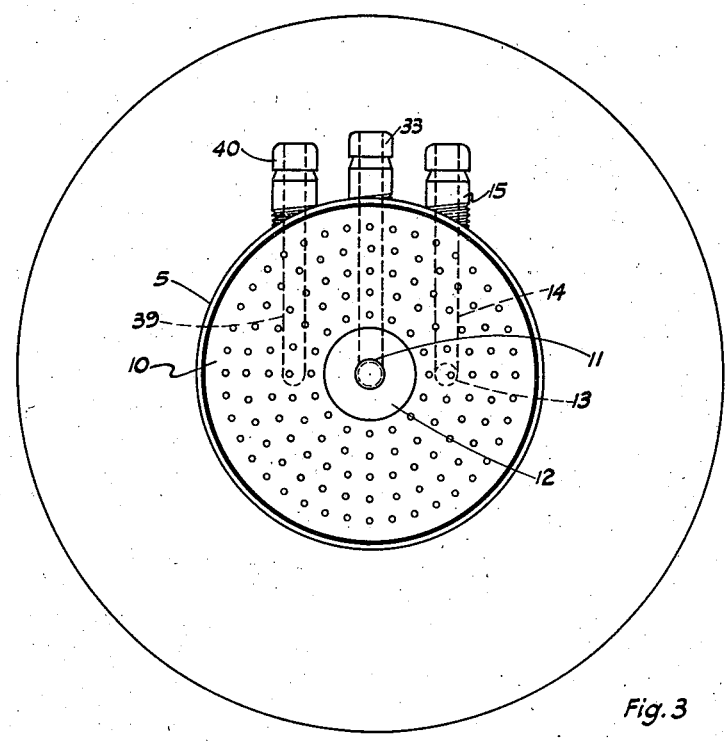
Fig. 3 is an inverted plan view of the float, showing the strainer and tube connection.
Figure 5:
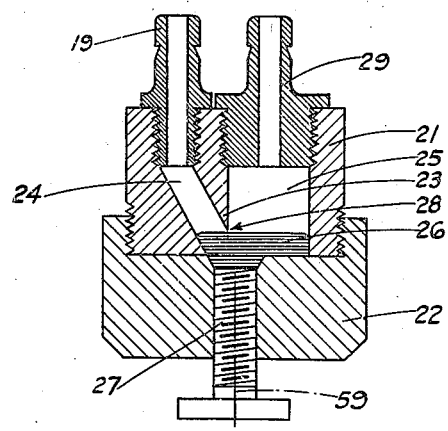
Fig. 5 is a similar view of another form of the said valve.

An intake chamber 9 is formed in the bottom of the central body 5, substantially coextensive in width with the diameter of the body. The chamber 9 is fitted across the mouth thereof with a strainer plate 10 (Figs. 2 and 3). This plate is held in position by a central screw stud 11 and a thumb screw 12. The intake chamber 9 communicates through a vertical passage 13 with a horizontal intake channel 14 which communicates at its outer end with a connection 15 (Fig. 3). One end of a flexible tube 16 (Fig. 1) is attached to the connection 15 (Fig. 3) and the tube 16 leads downwardly through the chemical solution in the main feed tank 2 (Fig. 1) to a coupling member fixed in the side of the tank 2. The coupling member 17 communicates in turn through a flexible tube 18 with the inlet connection 19 of an automatic proportional dosage valve 20 (see also Fig. 5).

The valve 20 (Fig. 5) is a non-blocking chemical valve comprising a hard rubber body consisting of an upper part 21 screw-threaded at its lower end to receive a lower part 22. The upper part 21 has a knife edge 23 formed between an inlet channel 24 and an outlet channel 25. A body or quantity of mercury 26 is contained in the lower or common portions of the channels 24, 25, the level of the mercury 26 being adjusted by a set-screw 27. The under surface or contour of the knife edge 23 is slightly arched and the level of the mercury 26 is adjusted so that it rises a slight distance up the sides of the arched knife edge and leaves a narrow space or gap 28 at the middle. The chemical solution which enters the connection 19 and passes from the inlet channel 24 to the outlet channel 25 through the space between the knife edge 23 and mercury 26 passes out of the valve through the connection 29, whence it flows upwardly through the flexible tube 30 (Fig. 1).

The upper end of the tube 30 is connected to a coupling member 31 passing through the side of the tank 2 and communicating with a flexible tube 32. The upper end of the tube 32 is attached to a connection 33 on the floating intake body 5 (Figs. 2 and 3). The connection 33 communicates with a horizontal passage 34 leading into a return channel 35, which constitutes the entrant side of a knife edge or weir 36. The exit side of the weir 36 is constituted by an inclined discharge channel 37 which is closed at its lower end by a screw stud 38 removable when required for cleaning purposes. As will be noted from Fig. 2, the channel 35 is also closed at the bottom by the stud 11 which is likewise removable for cleaning purposes.

A horizontal passage 39 communicates with the lower end of the inclined channel 37 and leads to a connection 40 (Fig. 3). The upper end of a third flexible tube 41 (Fig. 1) is attached to the connection 40 and is led down through the solution in the tank 2 to a coupling member 42 arranged at the side of the tank alongside the other coupling members 17 and 31. A spout 43 attached to the coupling member 42 is adapted to deliver solution into a drip funnel 44 provided at the top of a pipe 45 which leads into a weir chamber 46 below the level of the solution therein.

The automatic dosage valve 20 (Fig. 1) is mounted on a fulcrum 47. An arm 48 provided at its end with a weight 49 is formed or movable with the body of the valve 20 and the weight 49 causes this arm to be constantly pressed down upon a contact member 50 which is mounted in the slot 51 of a lever 52 by means of a stud 53 and wing nut 54. The lever 52 is mounted on a fulcrum 55 and is pivotally connected at its remote end to a rod 56 which is fixed to a float 57 and is guided for vertical movement in a bracket 58 fixed to the side of the weir chamber 46. The axis of the fulcrum 47 (Fig. 1) coincides with the medial plane of the valve 20 (see the chain-dotted line 59 in Fig. 5). The knife edge 23 is offset from this medial plane and from the middle or centre of the surface of the mercury 26 towards the inlet connection 19. Consequently, as the float 57 on the surface of the solution in the weir chamber rises, the valve body 20 will tip so that the surface of the mercury immediately below the knife edge 23 will recede therefrom and increase the valve opening or gap 28. Conversely, as the float 57 falls, the valve body 20 will tip so that the surface of the mercury 26 immediately below the knife edge 23 will approach towards the latter, thereby decreasing the valve opening or gap 28. In this manner, the flow of the chemical solution through the valve 20 will be regulated automatically in accordance with the variation in level of the liquid in the weir chamber 46.

The arm 48 on the body of the valve 20 and the lever 52 of the float 57 are so arranged that, when the flow over the weir of the chamber 46 ceases, both the arm 48 and lever 52 will come to rest in a horizontal position. By this arrangement, it is ensured that the mercury 26 (Fig. 5) will always shut off the valve opening 28 exactly at the time when the level of the liquid in the chamber 46 falls to the level of the weir, irrespective of the position to which the stud 53 and nut 54 may have been adjusted along the slot 51.

As will be seen from Fig. 2, the extension 4 of the intake body 5 is formed with a central bore 60, the upper part of which (continuous with the lower part or channel 35 already mentioned) serves as an air vent. An air vent 61 is also provided between the top of the extension 4 and the intake channel 14. These air vents 60, 61 serve to prevent the development of a siphon within the intake body 5 and the tubes for delivering the solution to its point of application, viz. the drip spout 43.

The float 1 (Fig. 2) rests on the solution in the tank 2 in such a manner that the weir 36 is always maintained at a constant distance $a$ below the surface of the solution irrespective of the position of the level $b$ thereof. The distance $a$ represents the difference in head on the dosage valve 20, being the difference between the head on the upstream side of the valve 20 (as constituted by the inlet chamber 9, passage 13, channel 14, tubes 16 and 18, and channel 24) and the head on the downstream side of the valve 20 (as constituted by the channel 25, tubes 30 and 32, passage 34 and return channel 35), and the equipment described ensures the constancy of pressure-differential on the valve by varying the head on the downstream side exactly in accordance with the variation in head on the upstream side as the level $b$ of the volume in the said tank 2 drops.

Figure 4:
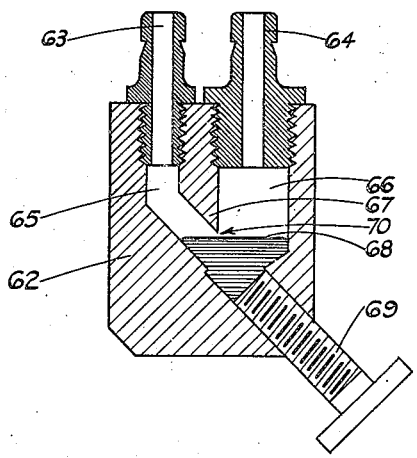
Fig. 4 is a view of one form of the mercury or like valve in vertical half section.

The weir 36 is situated at or near the centre of gravity of the floating intake device and, consequently, if the equilibrium of the device is disturbed, the effect on the constant differential head will be a minimum. If the dosage valve is to be used purely for regulating the volume of flow of the chemical solution, without variation of the flow automatically in proportion to the rise and fall of the liquid level in the weir chamber 46, the valve is simply fixed to the bottom of the main feed tank 2 or otherwise outside that tank below the lowermost level reached by the solution therein. A valve, suitable for this purpose, is illustrated in Fig. 4, and comprises a hard rubber valve body 62, inlet and outlet connections 63, 64 inlet and outlet channels 65, 66, a knife edge 67, a body of mercury 68 and an adjusting screw 69. Volume regulation of the flow of solution from the channel 65 to the channel 66 is effected by varying the gap or opening 70 by turning the screw 69. In this modification it is, of course, unnecessary that the knife edge 67 should be offset from the centre or middle of the surface of the mercury 68.

With my invention, the regulating valve is situated in all cases outside the main feed tank and its position is either rigid or at least such that it remains sufficiently steady for convenient operation of the regulating member of the valve. Moreover, since the necessity for the use of a ball valve or the like is eliminated, there is less liability for the flow of liquid to become clogged and a consequent saving in cleaning and maintenance is effected. The invention also eliminates the necessity for a float valve in gravity automatic proportional dosing.

I claim:

1. Means for maintaining constant differential pressure across a valve for controlling flow of a liquid from a tank to a point of dosage, comprising, in combination, means for supporting the valve outside said tank at a point below the lowest level assumed by the liquid therein, intake means for leading liquid from said tank to the inlet side of said valve, a miniature weir, a float carried by the liquid in said tank and supporting said intake means and said weir at a constant distance below the surface of the liquid in said tank while an operating level is maintained therein, means whereby the outlet side of said valve communicates with the inlet side of said weir, and discharge means whereby the outlet side of said weir communicates with the point of dosage.

2. Means for maintaining constant differential pressure across a valve for controlling flow of a liquid from a tank to a point of dosage, comprising, in combination, means for supporting the valve outside said tank at a point below the lowest level assumed by the liquid therein, intake means for leading liquid from said tank to the inlet side of said valve, strainer means for said intake means, a miniature weir, a float carried by the liquid in said tank and supporting said intake means, said strainer means and said weir at a constant distance below the surface of the liquid in said tank while an operating level is maintained therein, means whereby the outlet side of said valve communicates with the inlet side of said weir, and means whereby the outlet side of said weir communicates with the point of dosage.

3. In combination with a valve for controlling flow of a liquid from a feed tank to a dosage tank the means for varying the opening of said valve in accordance with the level of the liquid in said dosage tank so as to effect automatic proportional dosage, and the means for maintaining constant differential pressure across said valve, including means for supporting the valve outside said feed tank at a point below the lowest level assumed by the liquid therein, intake means for leading liquid from said feed tank to the inlet side of said valve, a miniature weir, a float carried by the liquid in said tank and supporting said intake means and said weir at a constant level below the surface of the liquid in said feed tank while an operating level is maintained therein, means whereby the outlet side of said valve communicates with the inlet side of said weir, and means whereby the outlet side of said weir communicates with the point of dosage.

4. Means, according to claim 3, comprising a fulcrum for said valve, means whereby the opening of said valve is variable by tilting of said valve about said fulcrum, a float adapted to rest on the liquid in said dosage tank, and lever means whereby said valve is adapted to be tilted by said float so as to vary said valve opening in accordance with variations in the level of liquid in said dosage tank.

5. Means, according to claim 3, comprising a fulcrum for said valve, an inlet passage for said valve, an outlet passage for said valve, a body of fluid provided between said inlet and outlet passages, a knife edge disposed above said body of fluid and offset from the middle of the surface of said fluid, a float adapted to rest on the liquid in said dosage tank, and lever means whereby said valve is adapted to be tilted by said float so that as the level of liquid in said dosage tank rises or falls, the surface of said fluid will recede from or approach towards the knife edge and thereby increase or decrease the valve opening.

6. Means, according to claim 1, comprising air vent means provided between said intake and discharge means, so as to obviate the development of a siphon between said means.

7. Means, according to claim 1, comprising means whereby said floating intake means and weir are underslung below said float.

8. Means, according to claim 1, comprising means whereby said miniature weir is situated at or near the centre of gravity of said float so that if the equilibrium thereof is disturbed the effect on the constant differential head will be a minimum.

9. Means, according to claim 2, comprising a central intake chamber underslung below said float, a strainer plate, and means for securing said plate over the entrance for liquid to said chamber.

10. Means, according to claim 1, comprising a flexible conduit connecting said intake means with the inlet side of said valve, a second flexible conduit connecting the outlet side of said valve with the inlet side of said weir, and a third flexible conduit connecting the outlet side of said weir with the dosage point.

11. Means, according to claim 2, comprising a combined intake and weir body which is formed with a central bore having an upper part serving as an air vent for said weir, a middle part serving as the inlet side of said weir, and a lower part serving on a screw seating for a holding stud for said strainer.

12. Means, according to claim 1, comprising a combined intake and weir body which is formed with a central bore adapted to constitute the inlet side of said weir, and a downwardly inclined passage which branches off said central bore and constitutes at its intersection with said bore the miniature weir.

13. Means, according to claim 3, comprising an arm provided exteriorly on said valve, means whereby the opening of said valve is variable by tilting of said valve about said fulcrum, a float adapted to rest on the liquid in said dosage tank, a lever, means for connecting said lever to said float, a contact member which is adapted to bear upon said arm of said valve, means for adjustably securing said contact member to said lever, and fulcrum means for said valve and lever respectively whereby, at the moment when the flow of liquid from said dosage tank ceases, both said arm and lever will be in a horizontal position so that the valve opening will close at said moment irrespective of the position to which said contact member is adjusted on said lever.

RICHARD PIERPONT MOORE.